United States Patent
Kawada et al.

(10) Patent No.: US 7,473,080 B2
(45) Date of Patent: Jan. 6, 2009

(54) COMPRESSOR HAVING INTERNALLY MOUNTED INVERTER

(75) Inventors: Minoru Kawada, Kiyosu (JP);
Takayuki Hagita, Aichi-ken (JP);
Makoto Hattori, Kiyosu (JP);
Masahiko Asai, Kiyosu (JP); Hirofumi Hirata, Kiyosu (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 535 days.

(21) Appl. No.: 11/348,547

(22) Filed: Feb. 7, 2006

(65) Prior Publication Data

US 2006/0230781 A1 Oct. 19, 2006

(30) Foreign Application Priority Data

Apr. 18, 2005 (JP) ............................. 2005-119746
Aug. 29, 2005 (JP) ............................. 2005-247604

(51) Int. Cl.
*F04B 17/00* (2006.01)
*F04B 35/04* (2006.01)
*F25B 1/00* (2006.01)

(52) U.S. Cl. .................................. 417/423.14; 62/498
(58) Field of Classification Search .................. 62/498; 417/423.14, 313, 410.1, 410.3, 410.4; 310/89, 310/68 B
See application file for complete search history.

(56) References Cited

U.S. PATENT DOCUMENTS 3,148,514 A  9/1964  Mathis 4,226,669 A * 10/1980  Vilardi ........................ 159/6.1
4,234,526 A   11/1980  Mackay et al.
4,791,329 A * 12/1988  Ubukata et al. ........... 310/68 C
4,844,701 A   7/1989   Wolford et al.

(Continued)

FOREIGN PATENT DOCUMENTS

| JP | 6-6933      | 1/1994 |
| JP | 2002-191153 | 7/2002 |
| JP | 2003-254566 | 9/2003 |

OTHER PUBLICATIONS

European Search Report dated Aug. 1, 2006.

*Primary Examiner*—Devon C Kramer
*Assistant Examiner*—Alexander B Comley
(74) *Attorney, Agent, or Firm*—Westerman, Hattori, Daniels & Adrian, LLP.

(57) ABSTRACT

A compressor having an internally mounted inverter and having improved safety at low cost is provided. The compressor has a motor; a compressor mechanism driven by the motor; a first housing section having an opening and within which the motor is housed; a second housing section which is mounted on the first housing section and which closes the opening; a fixing member which fixes the second housing section to the first housing section; a controller which is provided on the first housing section and which controls the operation of the motor; a power supply section which supplies power to the controller; a protective cover which covers the controller; and a power source control apparatus which stops the supply of power to the controller by the power supply section or carries out a prescribed safety measure operation when the protective cover is removed from the controller. The protective cover has a shape which restricts manipulation of the fixing member by covering a manipulation section of the fixing member when the controller is covered.

7 Claims, 5 Drawing Sheets

U.S. PATENT DOCUMENTS

| | | |
|---|---|---|
| 5,129,239 A | 7/1992 | Thurman |
| 5,360,322 A * | 11/1994 | Henein et al. ............... 417/313 |
| 5,532,534 A * | 7/1996 | Baker et al. .................... 310/89 |
| 6,164,934 A * | 12/2000 | Niihara et al. ......... 417/423.14 |
| 6,198,183 B1 * | 3/2001 | Baeumel et al. ............... 310/52 |
| 6,361,281 B1 * | 3/2002 | Wurth et al. .................. 417/63 |
| 6,450,786 B1 * | 9/2002 | Koch et al. ............... 417/423.1 |
| 6,454,549 B2 * | 9/2002 | Shafer .................... 417/423.1 |
| 6,755,631 B2 * | 6/2004 | Kawashima et al. ........ 417/572 |
| 6,926,502 B2 * | 8/2005 | Lin et al. .................... 417/313 |
| 7,021,075 B2 * | 4/2006 | Shindo et al. ............... 62/259.2 |
| 7,112,045 B2 * | 9/2006 | Kimura et al. .............. 417/371 |
| 7,122,928 B2 * | 10/2006 | Shindo ........................ 310/89 |
| 2003/0002998 A1 * | 1/2003 | Makino et al. ............... 417/374 |
| 2003/0143090 A1 * | 7/2003 | Iritani et al. ............. 417/410.5 |
| 2003/0200761 A1 * | 10/2003 | Funahashi et al. ........... 62/228.4 |
| 2004/0013544 A1 * | 1/2004 | Kimura et al. ........... 417/410.5 |
| 2004/0109772 A1 * | 6/2004 | Ogawa et al. ............ 417/410.5 |
| 2004/0197213 A1 * | 10/2004 | Takemoto ................ 417/410.1 |
| 2004/0253124 A1 * | 12/2004 | Ioi et al. .................. 417/410.1 |
| 2005/0063836 A1 * | 3/2005 | Kimura et al. .............. 417/313 |

* cited by examiner

COMPRESSOR HAVING INTERNALLY MOUNTED INVERTER

BACKGROUND OF THE INVENTION

1. Field of the Invention

The present invention relates to a compressor having an internally mounted inverter and equipped with a safety apparatus.

This application is based on Japanese Patent Applications Nos. 2005-119746, and 2005-247604 the contents of which are incorporated herein by reference.

2. Description of Related At

In the coolant circuits of air-conditioners, a low temperature coolant which has been subjected to heat exchange by means of an internal heat exchanger or an external heat exchanger is compressed and output as a high temperature, high pressure gas coolant by a compressor, and circulated through the coolant circuit again.

Among these types of compressors, there are those that have, outside of the compressor mechanism which has an internally mounted motor, an inverter which controls the operation of the motor by controlling the voltage that is supplied to the motor.

An inverter supplies high voltage as the driving voltage for the motor. For example, in the compressors of air-conditioners used in automobiles, a voltage of the level of 310V is supplied to the inverter. For this reason, the electrically conducting parts of the inverter are housed within a casing, to prevent accidents due to electric shock from accidental contact.

In addition, in the inverter, a safety apparatus is provided so that during servicing, or the like, work is not done while the power is connected due to the worker forgetting to turn off the power, or the like.

As this type of safety apparatus, for example, the power supply breaking apparatus described in Japanese Unexamined Patent Application, First Publication No. Hei 6-6933, mentioned below, is known.

This power supply breaking apparatus has a power supply breaking means (a breaker) for cutting the power line in an abnormal situation, protective covers for protecting the terminals of the power line, a switch means for switching the power line on or off, in association with the removal or attachment of the protective covers, and a breaker drive means which cuts the power source line when the switch means is off.

This power supply breaking apparatus is configured such that when one of the protective covers is not attached, the breaker drive means caused the power supply breaking means to operate and the power supply line is cut off.

However, when the compressor mechanism is disassembled, the power conducting sections of the motor are exposed. In addition, when the inverter is supplied with electric power, there is the possibility that the motor may be operated unexpectedly while the compressor is in a disassembled state.

For this reason, conventionally, in compressors, it is necessary to provide a safety apparatus in both the inverter and the compressor mechanism, respectively, for cases in which the turning off of the power supply has been forgotten. This makes the structure of the compressor complex, and leads to increases in manufacturing costs.

BRIEF SUMMARY OF THE INVENTION

The present invention was achieved in consideration of the above-mentioned circumstances, and the present invention has an object of providing a compressor with an internally mounted inverter which improves safety at low cost (hereinafter simply referred as "compressor").

In order to solve the above-mentioned problems, the present invention the following means.

In detail, the present invention provides a compressor having an internally mounted inverter comprising a motor, a compressor mechanism driven by the motor, a housing main body having an opening and within which the motor is housed, a lid which is mounted on the housing main body and which closes the opening, a fixing member which fixes the lid to the housing main body, an inverter which is provided outside of the housing main body and which controls the operation of the motor, a power supply section which supplies power to the inverter, a protective cover which covers the inverter, a power source control apparatus which allows a supply of power to the inverter by the power supply section when the protective cover is covering the inverter, and stops the supply of power to the inverter by the power supply section or carries out a prescribed safety measure operation when the protective cover is removed from the inverter; the protective cover having a shape which restricts manipulation of the fixing member by covering a manipulation section of the fixing member when the inverter is covered.

In a compressor constituted in the above-mentioned way, when the inverter is covered by the protective covering, the power source control apparatus allows the supply of power to the inverter from the power supply section, and therefore, operation of the compressor is possible.

In addition, when the protective cover is removed from the inverter, the power source control apparatus stops the supply of power to the inverter from the power supply section or performs a prescribed safety measure operation, and therefore, electric shocks, or the like, due to accidental contact with the inverter are prevented. Here, as the safety measure operation, for example, there are operations such as the discharging of high voltage parts and high voltage circuits such as the condenser within the inverter, or the like, the stopping of the supply of high voltage power from the power supply while continuing the supply of low voltage power to maintain some of the functions of the inverter, and the like.

With this compressor, since the lid is fixed to the housing main body by the fixing member, in order for a worker to access the inside of the housing main body by removing the lid from the housing main body, it is necessary for the fixing member to be manipulated.

With the compressor of the present invention, when the protective cover is covering the inverter, the protective cover covers the manipulation section of the fixing member, and restricts the manipulation of the fixing member. For example, when the fixing member is a bolt, the protective cover covers the head of the bolt and restricts the manipulations of the bolt.

For this reason, for a worker to manipulate the fixing member, it is necessary for the protective cover to be removed from the inverter.

In more detail, with this compressor, in either of the situation in which a worker is accessing the inverter or the situation in which a worker is accessing the inside of the housing main body, it is necessary for the protective cover to be removed from the inverter. Furthermore, as mentioned above, by removing the protective cover from the inverter, the supply of power to the inverter is stopped or a safety measure is undertaken.

Note, that when the lid of the compressor is fixed to the housing main body by a plurality of fixing members, it is sufficient for the protective cover to be formed so as to cover at least one of the fixing members.

Here, the power source control apparatus may have a part of the wiring which connects the power supply section and the inverter provided extending between the inverter and the protective cover, and when the protective cover is removed from the inverter, the wiring is disconnected and the supply of power to the inverter is stopped.

In addition, the power source control apparatus may also comprise a sensor which detects the removal of the protective cover, and when the removal of the protective cover is detected by the sensor, a safety measure operation is performed.

In this compressor, the protective cover may have a cover main body which covers the inverter and a fixing member cover section which covers the fixing member, and the fixing member cover section may be formed having a plate shape which is parallel to a mounting direction of the protective cover with respect to the inverter.

With a compressor constituted in this way, when the protective cover is being mounted on the inverter, by moving the protective cover in the mounting direction with respect to the inverter, the fixing member cover section is moved parallel to the plane thereof, and reaches a position facing the fixing member. Furthermore, even if there are variations within dimensional tolerances or assembly tolerances in the protective cover, the fixing member cover section will not interfere with other parts, and stresses will not become concentrated on the protective cover, therefore, it is difficult for damage such as fatigue fractures, or the like, to occur even after long periods of use.

Here, the cover main body and the fixing member cover section may be connected via a plate-shaped connecting section which is parallel to the mounting direction of the cover main body with respect to the inverter, and which intersects with the fixing member cover section.

In this case, since the protective cover is formed in a shape which is bent in a plurality of directions, the flexural rigidity is high and it is difficult for displacement from the site facing the fixing member even if force is applied to the fixing member cover section. Therefore, it is not possible to manipulate the fixing member accidentally while the protective cover is mounted.

A compressor having an internally mounted inverter is provided which has a motor, a compressor mechanism driven by the motor, a housing main body having an opening and within which the motor is housed, a lid which is mounted on the housing main body and which closes the opening, a fixing member which fixes the lid to the housing main body, an inverter which is provided outside of the housing main body and which controls the operation of the motor, a power supply section which supplies power to the inverter, a protective cover which covers the inverter, a power source control apparatus which allows the supply of power to the inverter by the power supply section when the protective cover is covering the inverter and stops the supply of power to the inverter by the power supply section or carries out a prescribed safety measure operation when the protective cover is removed from the inverter; the protective cover having a cover main body which covers the inverter, and a stopper section which, when the protective cover is covering the inverter, projects out over a movement path of the lid taken by the lid when the lid is being removed from the housing main body.

With a compressor constituted in this way, when the inverter is covered by the protective cover, since the power source control apparatus allows the supply of power to the inverter from the power supply section, it is possible to operate the compressor.

In addition, when the protective cover is removed from the inverter, the power source control apparatus stops the supply of power to the inverter from the power supply section or performs a prescribed safety measure operation, and therefore, electric shocks, or the like, due to accidental contact with the inverter are prevented. Here, as the safety measure operation, for example, there are operations such as the discharging of high voltage parts and high voltage circuits such as the condenser, or the like, within the inverter, the stopping of the supply of high voltage power from the power supply while continuing the supply of low voltage power to maintain some of the functions of the inverter, and the like.

On the other hand, with this compressor, when the protective cover is covering the inverter, the stopper section of the protective cover projects out over the movement path of the lid taken by the lid when the lid is being removed from the housing main body. Thereby, when the protective cover is covering the inverter, even if an attempt is made to remove the lid from the housing main body, the stopper section interferes with the lid, and the lid cannot be removed.

In this way, with this compressor, for a worker to remove the lid from the housing main body and access the inside of the housing main body, it is necessary for the protective cover to be removed.

As mentioned above, with this compressor, in either of the situation in which a worker is accessing the inverter or the situation in which a worker is accessing the inside of the housing main body, it is necessary for the protective cover to be removed from the inverter. Furthermore, as mentioned above, by removing the protective cover from the inverter, the supply of power to the inverter is stopped or a safety measure is undertaken.

Here, the power source control apparatus may have a constitution in which a part of the wiring which connects the power supply section and the inverter is provided extending between the inverter and the protective cover, and when the protective cover is removed from the inverter, the wiring is disconnected and the supply of power to the inverter is stopped.

In addition, the power source control apparatus may also comprise a sensor which detects the removal of the protective cover, and when the removal of the protective cover is detected by the sensor, a safety measure operation is performed.

Here, the stopper section may be fixed to both the housing main body and the lid by means of a fixing member.

In this case, when a worker releases the fixing of housing and the lid by the fixing member, it is possible for the worker to become aware of the presence of the stopper section. In other words, with this constitution, since it is possible for a worker to immediately understand that it is not possible to remove the lid without removing the protective cover, it is possible for the disassembly operation to be carried out quickly.

In addition, the above-mentioned compressor may comprise a coolant circuit for an air-conditioner, and the inverter may be provided in the vicinity of a coolant intake of the housing main body, and is capable of heat transfer.

The compressor which comprises a coolant circuit of an air-conditioner, compresses a low temperature gas coolant which has completed heat transfer by means of an internal heat exchanger or an external heat exchanger and outputs it as a high temperature, high pressure gas coolant. For this reason, at the coolant intake side, the temperature of the housing main body is a comparatively low.

Therefore, as described above, the inverter which controls the operation of the motor of the compressor is provided in the vicinity of the coolant intake of the housing main body, and makes heat transfer between itself and the housing main body possible. As a result, it is possible to cool the inverter by the release of heat from the inverter to the housing main body.

By means of cooling the inverter in this way, when the air-condition is installed in a high temperature environment such as in the engine compartment of a vehicle, for example, it is possible to reduce the effects due to the heating of the electronic parts that make up the inverter without the use of a special cooling structure, and it is possible to improve the reliability of the compressor at low cost.

By means of the compressor of the present invention, with a single safety apparatus, it is possible to ensure safety for either of the case in which a worker accesses the inverter or the case in which a worker accesses the inside of the housing main body, and it is possible to ensure a high degree of safety without incurring costs.

DETAILED DESCRIPTION OF THE INVENTION

In the following, embodiments of the present invention are explained with reference to the figures.

FIRST EMBODIMENT

In the following, a first embodiment of the present invention is explained with reference to FIGS. 1 to 3.

Figure 1:
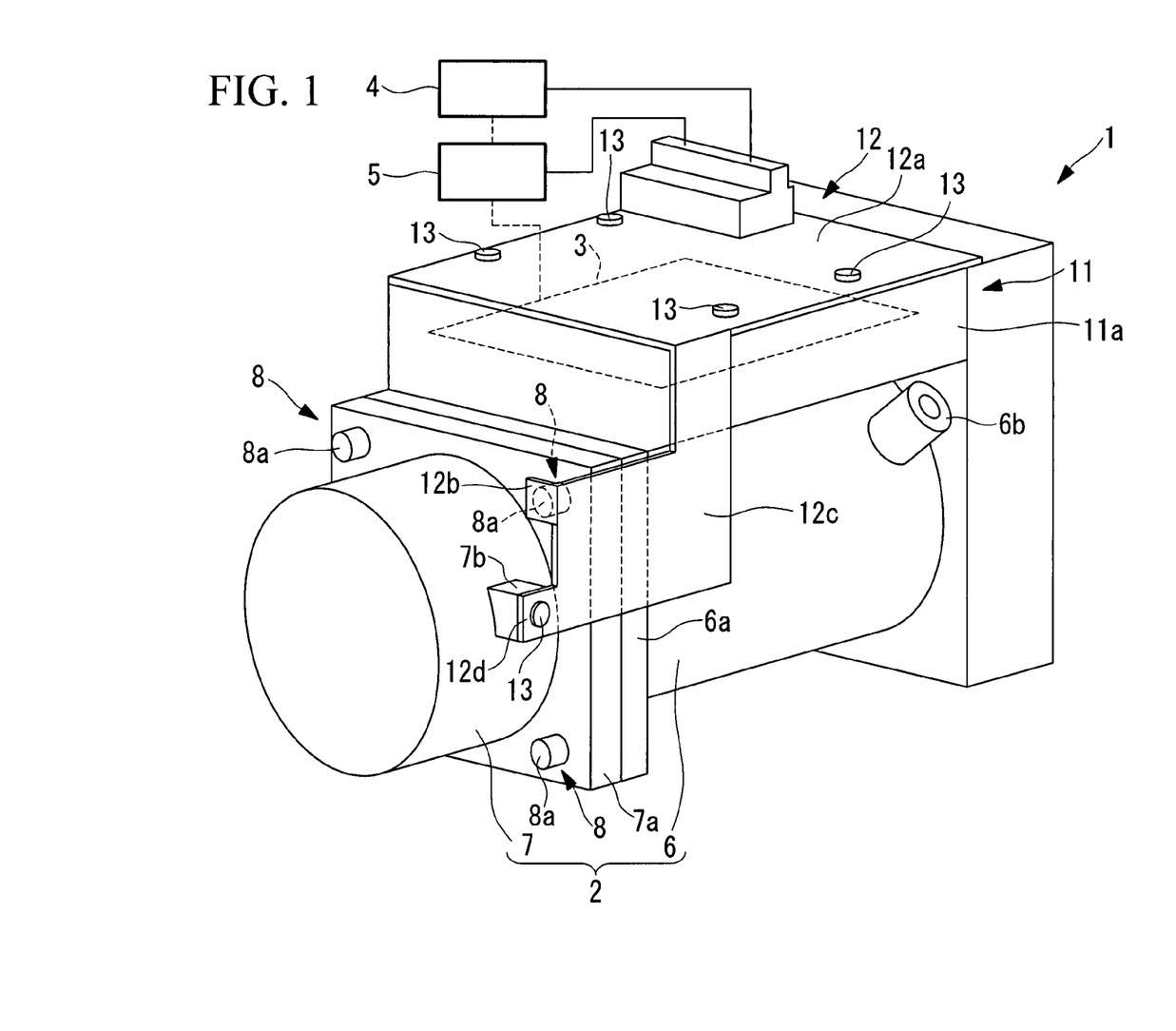
FIG. 1 is a perspective diagram showing the structure of a compressor according to a first embodiment of the present invention.

This embodiment shows an example in which the present invention is applied to a compressor 1 comprising a coolant circuit of an air-conditioner, shown in FIG. 1.

The compressor 1 has a motor, a compressor mechanism which is driven by the motor, a housing 2 for housing the motor and the compressor mechanism, a controller 3 (inverter) which controls the operation of the motor and which is provided outside of the housing 2, a power supply section 4 for supplying power to the controller 3, and a power source control apparatus 5 for controlling the operation of the controller 3 and the power supply section 4.

The housing 2 has a hollow cylindrical shape and is arranged with the axis approximately horizontal.

Figure 2:
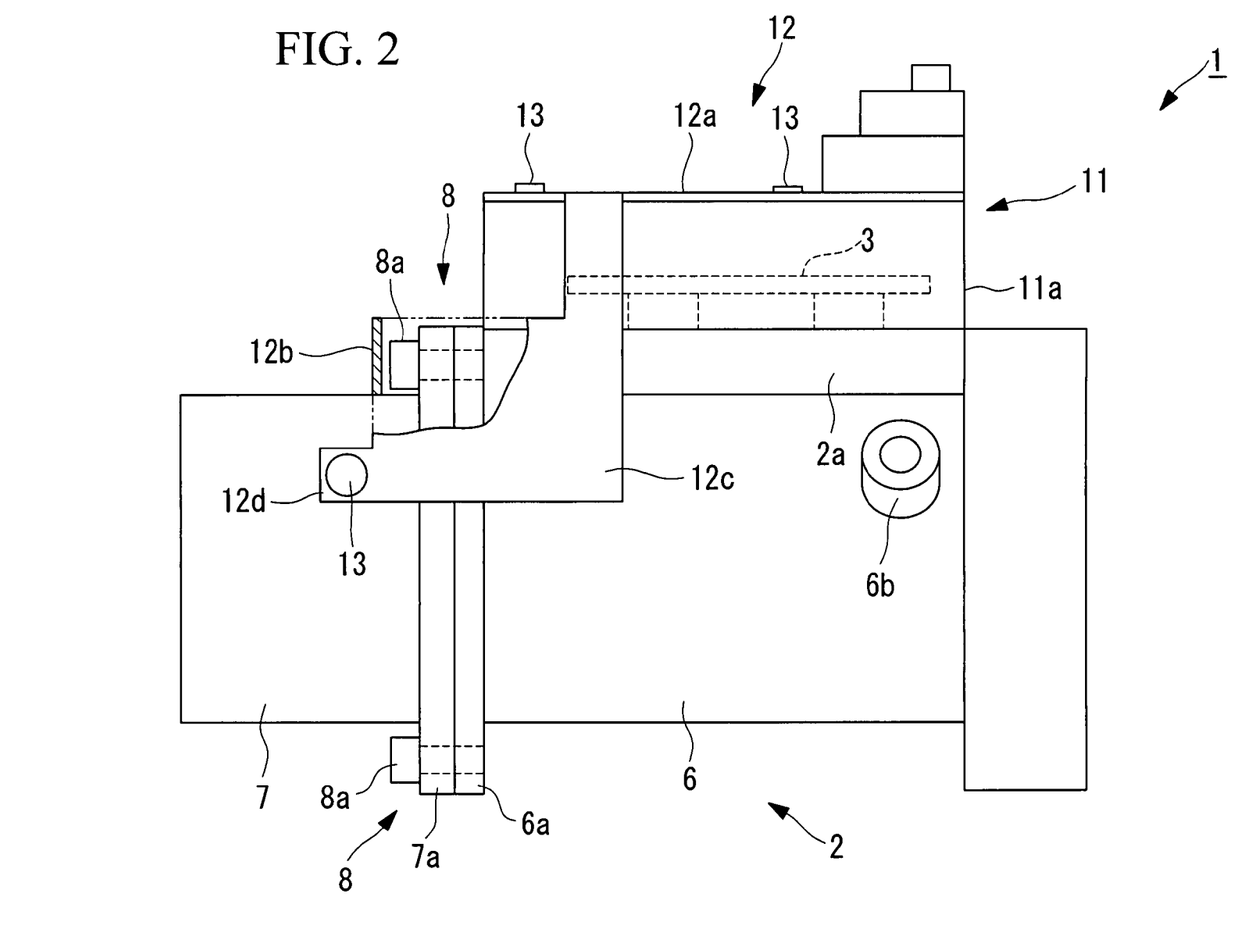
FIG. 2 is a partially cut away side view showing the structure of the compressor according to the first embodiment of the present invention.

More specifically, as shown in FIGS. 1 and 2, the housing 2 has a first housing section 6 (a housing main body) which has a cylindrical shape with a closed end and which has an opening in the open end, a second housing section 7 (a lid) which has a cylindrical shape with a closed end and which has an opening in the other end, and a fixing member 8 which detachably fixes the first housing section 6 and the second housing section 7 in a condition with their respective openings facing each other.

In this embodiment, an external flange 6a having an approximately square external shape is provided at the open end of the first housing section 6, and screw holes are formed in the axial direction in each corner section of the external flange 6a, respectively.

An external flange 7a having an approximately square external shape is provided at the open end of the second housing section 7, and through holes are respectively formed in each corner section of the external flange 7a in an arrangement identical to the arrangement of the screw holes in the external flange 6a.

In addition, as the fixing member 8, a bolt is used which is inserted into the through hole of the external flange 7a from the closed end side of the second housing section 7 and which screws into the screw hole of the outer flange 6a of the first housing section 6.

As shown in FIG. 2, the first and second housing sections 6 and 7 are attached with the external flange 6a and the external flange 7a arranged face to face and each of the screw holes of the external flange 6a matched with each of the through holes of the external flange 7a, by inserting the bolts which are fixing members 8 respectively into each through hole from the closed end side of the second housing section 7 and screwing the bolts into the screw holes corresponding to the through holes. In more detail, the bolts which are the fixing members 8 are screwed into the screw holes with their axes approximately parallel to the axis of the housing 2, and the heads 8a (the manipulation sections) of the bolts are positioned at the closed end side of external flange 7a of the second housing section 7.

A low pressure coolant chamber is provided internally within the closed end of the first housing section 6, and a coolant which has passed through an internal heat exchanger or an external heat exchanger of the air-conditioner is fed in via the coolant intake 6b provided on the side surface of the first housing section 6.

In other words, the part of the first housing section 6 in the vicinity of the coolant intake 6b has a lower temperature compared with other parts of the housing 2.

A compressor base 2a which lies in the longitudinal direction of the housing 2 is provided on the upper surface of the housing 2, and on this compressor base 2a, a protective case 11 which houses the controller 3 is provided.

Here, the compressor base 2a is formed from a material having a high thermal conductivity such as aluminum or an aluminum-based alloy. In addition, the controller 3 is arranged at a position in the vicinity of the coolant intake 6b of the first housing section 6 on the inside of the protective case 11.

As a result, highly efficient heat transfer occurs between the first housing section 6 and the controller 3, and since the heat of the controller 3 is efficiently given off to the first housing section 6, it is possible to reduce the effect of heat on the electrical parts which make up the controller 3 without the use of a special cooling structure and even when the air-conditioner is installed in a high temperature environment such as in the engine compartment of a vehicle, for example, and it is possible to improve the reliability of the compressor at low cost.

It is needless to say that the circuit on the controller 3, the protective case 11, and the compressor base 2a are electrically insulated from each other.

Figure 3:
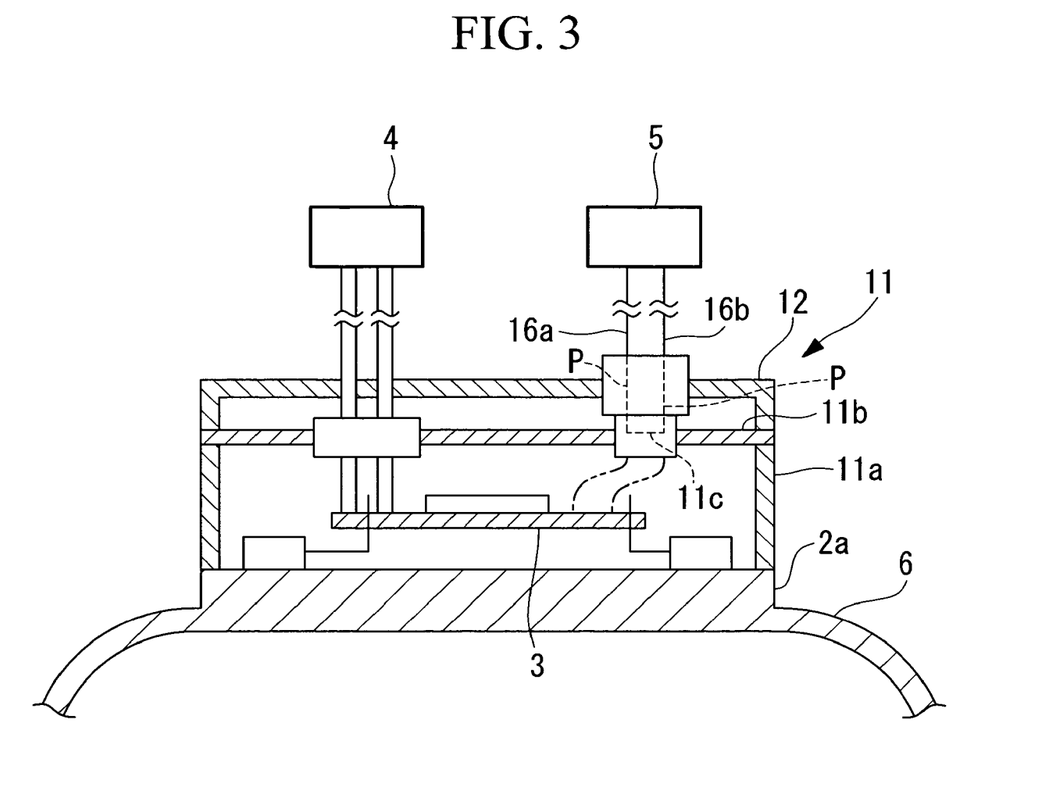
FIG. 3 is a longitudinal cross-section showing the structure of the compressor according to the first embodiment of the present invention.

As shown in FIG. 3, the protective case 11 has a case main body 11a having a rectangular box shape, the upper surface of which is open and the outer side of the base is fixed to the compressor base 2a, and a lid 11b which is provided removably attached to the opening of the case main body 11a and which closes the opening.

The case main body 11a has thermal conductivity, and thereby, heat transfer (thermal conduction) between the controller 3 and the compressor base 2a is permitted.

The lid 11b is fixed to the case main body 11a by means of fixing members such as screws, for example, and is such that, unless all of the fixing members are removed, it is not possible to access the controller 3.

As shown in FIG. 1 and FIG. 2, the protective cover 12 which covers the lid 11b is fixed by means of fixing members 13, such as screws, to the protective case 11, and is such that, unless all of the fixing members 13 are removed, it is not possible to access the fixing members which fix the lid 11b.

The protective cover 12 has a cover main body 12a which covers the lid 11b from the upper surface, and a fixing member cover section 12b which covers the manipulation part 8a of one of the fixing members 8 provided in the upper part of the housing 2.

In this embodiment, the cover main body 12a is formed having a roughly rectangular plate shape running in the longitudinal direction of the housing 2, and has a connecting section 12c, which extends in the downward direction at the side of the second housing section 7 from the edge in the width direction, provided at the edge of the cover main body 12a toward the closed end of the second housing section 7. This protective cover 12 is mounted from above with respect to the protective case 11 with the cover main body 12a in a roughly horizontal condition.

The connecting section 12c is formed in a plate shape being roughly orthogonal with respect to the cover main body 12a, and on the lower edge thereof at the side toward the closed end of the second housing section 7, a plate-shaped fixing member cover section 12b which is roughly orthogonal with respect to the cover main body 12a and the connecting section 12c is provided.

In other words, the fixing member cover section 12b is connected to the cover main body 12a via the plate-shaped connecting section 12c which is roughly parallel to the mounting direction (in this case the vertical direction) of the protective cover 12 with respect to the controller 3 and intersects with the fixing member cover section 12b. In addition, the fixing member cover section 12b is provided roughly orthogonal to the axis of the housing 2, and thereby, the head 8a of the fixing member 8 is covered by the fixing member cover section 12b from the axial direction.

In addition, a projecting section 12d which projects along the side of the second housing section 7 is provided on the connecting section 12c. This projecting section 12d is fixed by means of a fixing member 13, such as a screw, to the mounting 7b which is provided laterally on the second housing section 7.

A pair of signal wires 16a and 16b, each having one end thereof connected to the power source control apparatus 5, are attached to the protective cover 12 at a position opposite the lid 11b, with the other ends thereof exposed. On these other ends of the signal wires 16a and 16b, contact points P are respectively provided.

On the upper surface (external surface) of the lid 11b, a conductor 11c is provided at a position opposing the contact points P of the signal wires 16a and 16b when the protective cover 12 is mounted on the lid 11b. Only when the protective cover 12 is mounted on the lid 11b does this conductor 11c make contact with the contact points P of the signal wires 16a and 16b connecting them electrically.

The power source control apparatus 5 is constituted such that the supply of power to the controller 3 by the power supply section 4 is allowed when the protective cover 12 is covering the lid 11b (in other words, when the controller 3 is covered), and the supply of power to the controller 3 by the power supply section 4 is stopped or a prescribed safety measure operation is undertaken when the protective cover 12 is removed from the lid 11b (in other words, it is removed from the controller 3).

The power source control apparatus 5 judges that the protective cover 12 is covering the lid 11b when the pair of wires 16a and 16b are conducting electricity, and judges that the protective cover 12 has been removed from the lid 11b when the signal wires 16a and 16b are not conducting electricity.

In this embodiment, the safety apparatus of the compressor is formed by the above-mentioned power source control apparatus 5 and the protective cover 12.

With a compressor 1 constituted in the above-described way, since the power source control apparatus 5 allows the supply of power to the controller 3 from the power supply section 4 when the controller 3 is covered by the protective cover 12, it is possible for the compressor 1 to be operated.

In addition, since the power source control apparatus 5 stops the supply of power to the controller 3 from the power supply section 4 or causes a prescribed safety measure operation to be carried out when the protective cover 12 is removed from the controller 3, it is possible to prevent electric shocks, and the like, due to accidental contact with the controller 3. Here, as the safety measure operation, for example, there are operations such as the discharging of high voltage parts and high voltage circuits such as the condenser within the controller 3, or the like, the stopping of the supply of high voltage power from the power supply section 4 while continuing the supply of low voltage power to maintain some of the functions of the controller 3, and the like.

On the other hand, in this compressor 1, the second housing section 7 is fixed by means of fixing members 8 to the first housing section 6, and in order for a worker to access the inside of the housing by removing the second housing section 7 from the first housing section 6, it is necessary to manipulate the fixing members 8.

With this compressor 1, when the protective cover 12 is covering the controller 3, the protective cover 12 covers the manipulation section 8a of the fixing member 8, and restricts the manipulation of the fixing members 8. In other words, in this embodiment, the protective cover 12 restricts the manipulation of the bolt by covering the head (manipulation section 8a) of the bolt which is the fixing member 8.

For this reason, for a worker to manipulate the fixing member 8, it is necessary for the protective cover 12 to be removed from the controller 3.

In more detail, with this compressor 1, in either of the situation in which a worker is accessing the controller 3 or the situation in which a worker is accessing the inside of the housing 2, it is necessary for the protective cover 12 to be removed from the controller 3. As mentioned above, when the protective cover 12 is removed from the controller 3, the supply of power to the controller 3 is stopped or a safety measure is undertaken.

Thereby, according to the compressor 1, with a single safety apparatus, it is possible to ensure safety in either of the case in which a worker accesses the controller 3 or the case in which a worker accesses the inside of the housing 2, and it is possible to ensure a high degree of safety without incurring cost.

In addition, with this compressor 1, the fixing member cover section 12b of the protective cover 12 is formed having a plate shape which is parallel to the mounting direction of the protective cover 12 with respect to the controller 3. Therefore, when the protective cover 12 is being mounted on the controller 3, by moving the protective cover 12 in the mounting direction with respect to the controller 3, the fixing member cover section 12b is moved parallel along the plane thereof, and reaches a position facing the fixing member 8.

In other words, even if there are variations within dimensional tolerances or assembly tolerances in the protective cover 12, the fixing member cover section 12b does not interfere with other parts, and stresses do not become concentrated on the protective cover 12, therefore, it is unlikely that damage such as fatigue fractures, or the like, will occur even over long periods of use.

In addition, with the compressor 1, the cover main body 12a and the fixing member cover section 12b are connected via the plate-shaped connecting section 12c which is parallel to the mounting direction of the cover main body 12a with respect to the controller 3 and intersects with the fixing member cover section 12b. In other words, since the protective cover 12 is formed in a shape which is bent in a plurality of directions, the flexural rigidity is high and it is difficult for displacement from the site facing the fixing member 8 even if force is applied to the fixing member cover section 12b. Therefore, it is not possible to manipulate the fixing member 8 accidentally while the protective cover 12 is mounted.

Here, in the above-mentioned embodiment, an example is shown in which the contact points P of the pair of signal wires 16a and 16b are provided in the protective cover 12, and the conductor 11c which connects the pair of signal wires 16a and 16b is provided in the lid 11b of the protective case 11. However, there is no limitation to this arrangement, for example, instead of providing the contact points P and the conductor 11c, a structure may be adopted in which a sensor, such as a limit switch which is switched to ON while the protective cover 12 is mounted on the lid 11b, is provided in the protective cover 12, and the power source control apparatus 5 detects whether the protective cover 12 is mounted based on the detection results of the sensor.

In addition, instead of providing a conductor 11c, as shown by the chain double-dashed lines in FIG. 3, a constitution in which the wiring 11d and 11e which connect the signal wires 16a and 16b to the controller 3 are provided, and it is detected whether or not the controller 3 is connected to the power source control apparatus 5 via the signal wires 16a and 16b. When they are not connected, it is judged that the protective cover 12 is not attached, and a safety measure operation is carried out.

SECOND EMBODIMENT

In the following, a compressor according to a second embodiment of the present invention will be explained using FIG. 4.

Figure 4:
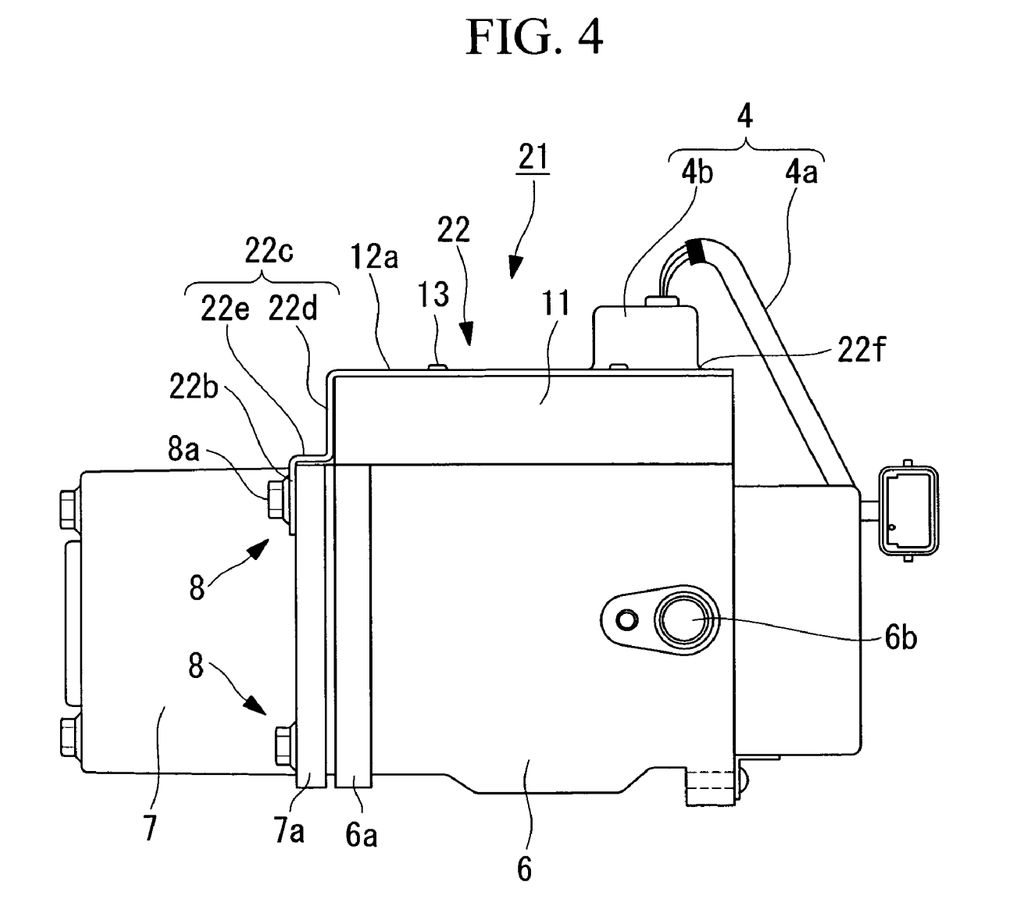
FIG. 4 is a side view showing the structure of a compressor according to a second embodiment of the present invention.

As shown in FIG. 4, a compressor 21 according to the present embodiment is primarily characterized by using a protective cover 22 in place of the protective cover 12 which forms the safety apparatus in the compressor 1 shown in the first embodiment. In the following, parts which are similar or identical to parts in the first embodiment are indicated using the same references and a detailed explanation thereof will be omitted.

The protective cover 22 does not have the fixing member cover section 12b and the connecting section 12c of the protective cover 12. Instead, the protective cover 22 has a stopper section 22b which, when the protective cover 22 is covering the controller 3, projects out over the movement path of the second housing section 7 taken by the second housing section 7 when the second housing section 7 is being removed from the first housing section 6.

More specifically, the protective cover 22 has a plate-shaped stopper section 22b which extends downward along a plane orthogonal to the axis of the housing 2 (in other words, roughly parallel to the mounting direction of the protective cover 22 with respect to the controller 3), at the edge of the cover main body 12a on the side toward the second housing section 7.

In this embodiment, the stopper section 22b is connected to the cover main body 12a via the connecting section 22c.

The connecting section 22c is formed in a shape which extends along the surface of the protective case 11 and the surface of the housing 2. More specifically, at the edge of the cover main body 12a on the side toward the second housing section 7, there is a vertical section 22d which extends downward from that edge in a plane which is roughly orthogonal to the axis of the housing 2, and a horizontal section 22e which extends toward the closed end of the second housing section 7 in the axial direction of the housing 2 from the lower edge of the vertical section 22d.

Furthermore, the stopper section 22b is connected to the edge of the horizontal section 22e, and is fixed to the first and second housing sections 6 and 7 by the fastening together of the first housing section 6 and the second housing section 7 by means of one of the bolts which are fixing members 8.

In addition, in this embodiment, a terminal for the supply of power to the controller 3 is provided in the lid 11b provided inside the protective case 11. The power supply section 4 has a power supply cable 4a for supplying power to the controller 3, and a connector 4b which is provided at the end of the power supply cable 4a and which connects the power supply cable 4a and the terminal for supply of power of the lid 11b.

A connector mounting 22f on which the connector 4b is mounted is provided on the cover main body 12a of the protective cover 22, such that when the connector 4b is mounted on the connector mounting 22f, it is possible to connect the power supply cable 4a to the terminal for supplying power of the lid 11b.

With a compressor 21 formed in the above-mentioned way, in the same way as with the compressor 1 shown in the first embodiment, when a worker accesses the controller 3, it is necessary to remove the protective cover 22 from the controller 3.

In addition, with the compressor 21, when the protective cover 22 is covering the controller 3, the stopper section 22b of the protective cover 22 projects out over the path of movement taken by the second housing section 7 when the second housing section 7 is being removed from the first housing section 6. As a result, when the protective cover 22 is covering the controller 3, even if an attempt is made to remove the second housing section 7 from the first housing section 6, the stopper section 22b interferes with the second housing section 7, and it is not possible to remove the second housing section 7.

In this way, with this compressor 21, in order for a worker to access the inside of the housing by removing the second housing section 7 from the first housing section 6, it is necessary to remove the protective cover 22.

As mentioned above, with this compressor 21, in either of the situation in which a worker is accessing the controller 3 or the situation in which a worker is accessing the inside of the housing 2, it is necessary for the protective cover 22 to be removed from the controller 3. In addition, as mentioned above, when the protective cover 22 is removed from the controller 3, the supply of power to the controller 3 is stopped or a safety measure is undertaken.

As a result, by means of this compressor 21, with a single safety apparatus, it is possible to ensure safety in either of the case in which a worker accesses the controller 3, and the case in which a worker accesses the inside of the housing 2, and it is possible to ensure a high degree of safety without incurring cost.

In addition, by means of the compressor 21, since the shape of the protective cover 22 is simple, the manufacturing cost is low. In addition, with this compressor 21, since it is not necessary to provide a mounting 7b on the housing 2, the shape of the housing 2 can be simplified, the formability of the housing 2 can be improved, and the yield can be improved.

Furthermore, with this compressor 21, since a fixing member 13 for fixing the protective cover 22 to the mounting 7b is not necessary, the number of parts can be kept low, the number of steps in assembly can be kept low, and therefore, the manufacturing costs are low.

In addition, with the compressor 21, the stopper section 22b is connected to the edge of the horizontal section 22e, and is fixed to the first and second housing sections 6 and 7 by means of the fastening together of the first housing section 6 and second housing section 7 by means of one of the fixing members 8.

Thereby, when a worker releases the fastening of the first housing section 6 and the second housing section 7 by the fixing member 8, it is possible for the worker to become aware of the presence of the stopper section 22b. In other words, with this compressor 21, since it is possible for a worker to immediately understand that it is not possible to remove the second housing section 7 without removing the protective cover 22, it is possible for the disassembly operation to be carried out quickly.

In addition, with this compressor 21, the connector 4b which connects the power supply cable 4a of the power supply section 4 to the terminal for supplying power of the lid 11b is mounted on the cover main body 12a of the protective cover 22. For this reason, with the compressor 21, when the protective cover 22 is removed from the protective case 11, the connection of the power supply cable 4a and the terminal for supplying power of the lid 11b is cut, and the supply of power to the controller 3 by the power supply section 4 is stopped. Therefore, it is possible to ensure with greater reliability the safety of the worker.

Figure 5:
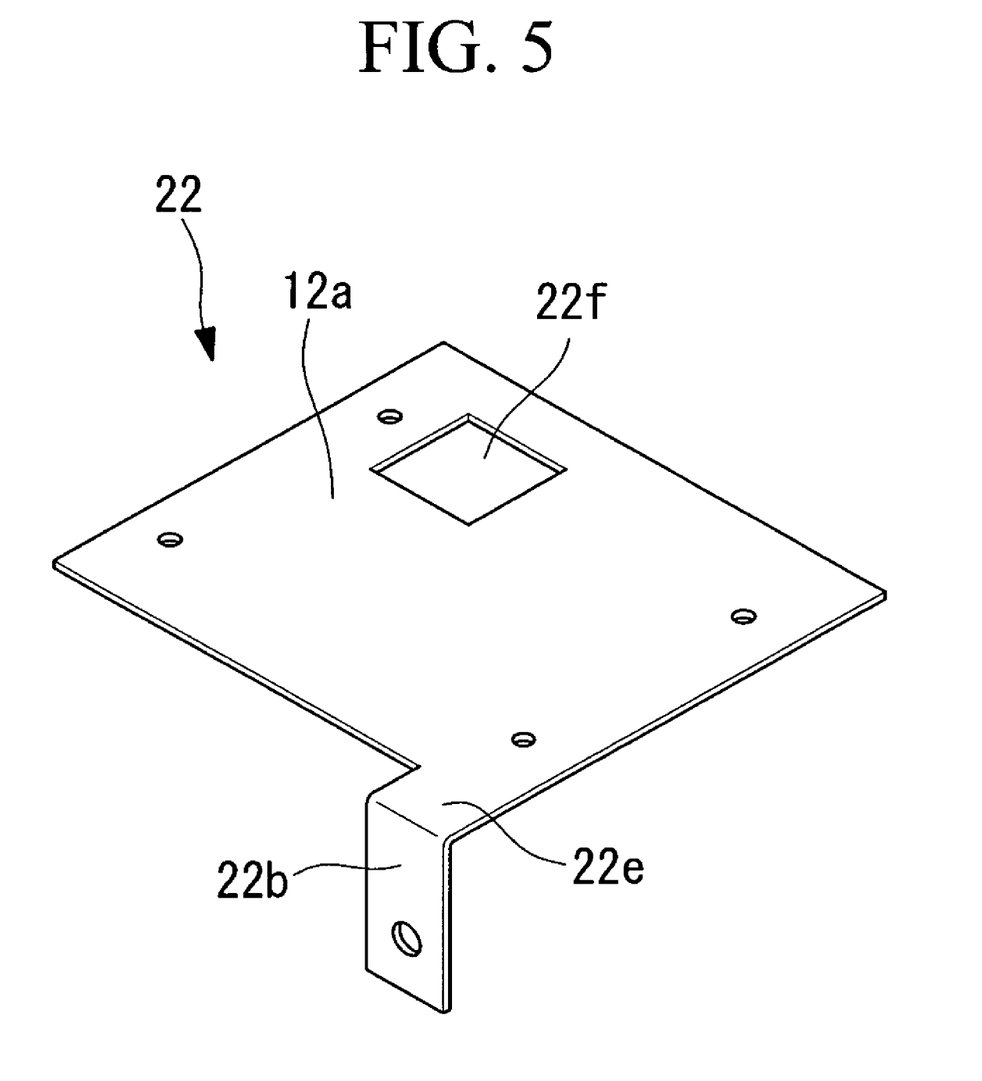
FIG. 5 is a perspective view showing another example of the form of a protective cover used in the compressor according to the second embodiment of the present invention.

Here, the present embodiment shows a constitution in which the connecting section 22c of the protective cover 22 has a vertical section 22d and a horizontal section 22e, but the structure is not limited to this, and as shown in FIG. 5, it is possible for the connecting section 22c to only have a horizontal section 22e. In that situation, the shape of the protective cover 22 is simpler, and the manufacturing costs can be further reduced.

What is claimed is:

1. A compressor having an internally mounted inverter, comprising:
    a motor;
    a compressor mechanism driven by the motor;
    a housing main body having an opening and within which the motor is housed;
    a lid which is mounted on the housing main body and which closes the opening;
    a fixing member which fixes the lid to the housing main body;
    an inverter which is provided outside of the housing main body and which controls the operation of the motor;
    a power supply section which supplies power to the inverter;
    a protective cover which covers the inverter; and
    a power source control apparatus which allows a supply of power to the inverter by the power supply section when the protective cover is covering the inverter, and stops the supply of power to the inverter by the power supply section or carries out a prescribed safety measure operation when the protective cover is removed from the inverter;
    the protective cover having a shape which restricts manipulation of the fixing member by covering a manipulation section of the fixing member when the inverter is covered.

2. A compressor having an internally mounted inverter according to claim 1, wherein the protective cover comprises a cover main body which covers the inverter and a fixing member cover section which covers the fixing member, and the fixing member cover section has a plate shape which is parallel to a mounting direction of the protective cover with respect to the inverter.

3. A compressor having an internally mounted inverter according to claim 2, wherein the cover main body and the fixing member cover section are connected via a plate-shaped connecting section which is parallel to the mounting direction of the cover main body with respect to the inverter, and which intersects with the fixing member cover section.

4. A compressor having an internally mounted inverter, comprising:
    a motor;
    a compressor mechanism driven by the motor;
    a housing main body having an opening and within which the motor is housed;
    a lid which is mounted on the housing main body and which closes the opening;
    a fixing member which fixes the lid to the housing main body;
    an inverter which is provided outside of the housing main body and which controls the operation of the motor;
    a power supply section which supplies power to the inverter;
    a protective cover which covers the inverter; and
    a power source control apparatus which allows the supply of power to the inverter by the power supply section when the protective cover is covering the inverter, and stops the supply of power to the inverter by the power supply section or carries out a prescribed safety measure operation when the protective cover is removed from the inverter;
    the protective cover having a cover main body which covers the inverter and a stopper section which, when the protective cover is covering the inverter, projects out over a movement path of the lid taken by the lid when the lid is being removed from the housing main body.

5. A compressor having an internally mounted inverter according to claim 4, wherein the stopper section is fixed to the housing main body and the lid by means of the fixing member.

6. A compressor having an internally mounted inverter according to claim 1, comprising a cooling circuit for an air-conditioner, wherein the inverter is provided in the vicinity of a coolant intake of the housing main body and is capable of heat transfer.

7. A compressor having an internally mounted inverter according to claim 4, comprising a cooling circuit for an air-conditioner, wherein the inverter is provided in the vicinity of a coolant intake of the housing main body and is capable of heat transfer.

* * * * *